(12) United States Patent
Pope et al.

(10) Patent No.: US 8,261,825 B2
(45) Date of Patent: Sep. 11, 2012

(54) METHODS FOR IMPROVING THE PRODUCTIVITY OF OIL PRODUCING WELLS

(75) Inventors: Gary A. Pope, Cedar Park, TX (US); Jimmie R. Baran, Jr., Prescott, WI (US); Vishal Bang, Houston, TX (US); Mukul M. Sharma, Austin, TX (US)

(73) Assignees: Board of Regents, The University of Texas System, Austin, TX (US); 3M Innovative Properties Company, St. Paul, MN (US)

( * ) Notice: Subject to any disclaimer, the term of this patent is extended or adjusted under 35 U.S.C. 154(b) by 146 days.

(21) Appl. No.: 12/745,405

(22) PCT Filed: Nov. 25, 2008

(86) PCT No.: PCT/US2008/084719
§ 371 (c)(1),
(2), (4) Date: May 28, 2010

(87) PCT Pub. No.: WO2009/073484
PCT Pub. Date: Jun. 11, 2009

(65) Prior Publication Data
US 2010/0319920 A1    Dec. 23, 2010

Related U.S. Application Data

(60) Provisional application No. 60/991,590, filed on Nov. 30, 2007.

(51) Int. Cl.
*E21B 43/26*      (2006.01)
*C09K 8/584*     (2006.01)
*C09K 8/588*     (2006.01)
*C09K 8/66*      (2006.01)

(52) U.S. Cl. .................................. 166/279; 166/308.1

(58) Field of Classification Search ...................... None
See application file for complete search history.

(56) References Cited

U.S. PATENT DOCUMENTS 2,732,398 A    1/1956  Brice et al.
(Continued)

FOREIGN PATENT DOCUMENTS

CA    2009732    8/1990
(Continued)

OTHER PUBLICATIONS

Adibhatla, B., et al., "Effect of surfactants on wettability of near-wellbore regions of gas reservoirs," J Petr Sci Engr (2006), 52:227-236.

(Continued)

*Primary Examiner* — Zakiya W Bates
(74) *Attorney, Agent, or Firm* — Edwin S. Flores; Chalker Flores, LLP

(57) ABSTRACT

Methods for treating clastic formations bearing brine and at least one of black oil or volatile oil using a composition containing a nonionic polymer and solvent. The solvent at least one of solubilizes or displaces at least one of brine or oil in the clastic formation. Methods for treating a formation having at least one fracture using a composition containing a nonionic polymer and solvent. Methods for making a composition for treating a clastic formation bearing brine and at least one of black oil or volatile oil.

20 Claims, 3 Drawing Sheets

U.S. PATENT DOCUMENTS

| | | | |
|---|---|---|---|
| 2,803,615 A | 8/1957 | Ahlbrecht et al. |
| 3,311,167 A | 3/1967 | O'Brien et al. |
| 3,394,758 A | 7/1968 | Terry et al. |
| 3,554,288 A | 1/1971 | Ross |
| 3,653,442 A | 4/1972 | Ross |
| 3,787,351 A | 1/1974 | Olson |
| 3,882,029 A | 5/1975 | Fischer et al. |
| 3,902,557 A | 9/1975 | Shaughnessy et al. |
| 4,018,689 A | 4/1977 | Thompson |
| 4,085,799 A | 4/1978 | Bousaid et al. |
| 4,200,154 A | 4/1980 | Tate |
| 4,329,236 A | 5/1982 | Alford et al. |
| 4,409,110 A | 10/1983 | Borchardt et al. |
| 4,432,882 A | 2/1984 | Raynolds et al. |
| 4,440,653 A | 4/1984 | Briscoe et al. |
| 4,460,791 A | 7/1984 | Cooke |
| 4,557,837 A | 12/1985 | Clark, III et al. |
| 4,565,639 A | 1/1986 | Penny et al. |
| 4,596,662 A | 6/1986 | Walker et al. |
| 4,609,043 A | 9/1986 | Cullick |
| 4,609,477 A | 9/1986 | Crema |
| 4,702,849 A | 10/1987 | Penny |
| 4,753,740 A | 6/1988 | Marlett et al. |
| 4,767,545 A | 8/1988 | Karydas et al. |
| 4,817,715 A | 4/1989 | Peru |
| 4,823,873 A | 4/1989 | Karydas |
| 4,921,619 A | 5/1990 | Karydas |
| 4,923,009 A | 5/1990 | Watkins |
| 4,975,468 A | 12/1990 | Yiv |
| 4,993,448 A | 2/1991 | Karydas et al. |
| 4,997,580 A | 3/1991 | Karydas et al. |
| 5,042,580 A | 8/1991 | Cullick et al. |
| 5,092,405 A | 3/1992 | Prukop |
| 5,129,457 A | 7/1992 | Sydansk |
| 5,143,958 A | 9/1992 | Lockhart et al. |
| 5,181,568 A | 1/1993 | McKown et al. |
| 5,186,257 A | 2/1993 | Stahl et al. |
| 5,219,476 A | 6/1993 | Lockhart et al. |
| 5,247,993 A | 9/1993 | Sarem et al. |
| 5,310,002 A | 5/1994 | Blauch et al. |
| 5,338,465 A | 8/1994 | Lockhart et al. |
| 5,358,052 A | 10/1994 | Gidley |
| 5,415,229 A | 5/1995 | Sydansk |
| 5,477,924 A | 12/1995 | Pollack |
| 5,733,526 A | 3/1998 | Trevino et al. |
| 5,823,262 A | 10/1998 | Dutton |
| 5,965,659 A | 10/1999 | Kubo et al. |
| 6,113,919 A | 9/2000 | Reiss et al. |
| 6,127,430 A | 10/2000 | Baran, Jr. et al. |
| 6,165,948 A | 12/2000 | Dewenter et al. |
| 6,206,102 B1 | 3/2001 | Pusch et al. |
| 6,225,263 B1 | 5/2001 | Collins et al. |
| 6,274,060 B1 | 8/2001 | Sakashita et al. |
| 6,443,230 B1 | 9/2002 | Boles et al. |
| 6,576,597 B2 | 6/2003 | Dobson, Jr. et al. |
| 6,579,572 B2 | 6/2003 | Espin et al. |
| 6,660,693 B2 | 12/2003 | Miller et al. |
| 6,664,354 B2 | 12/2003 | Savu et al. |
| 6,689,854 B2 | 2/2004 | Fan et al. |
| 6,729,409 B1 | 5/2004 | Gupta et al. |
| 6,767,869 B2 | 7/2004 | DiLullo et al. |
| 6,805,198 B2 | 10/2004 | Huang et al. |
| 6,852,781 B2 | 2/2005 | Savu et al. |
| 6,911,417 B2 | 6/2005 | Chan et al. |
| 6,945,327 B2 | 9/2005 | Ely et al. |
| 6,972,274 B1 | 12/2005 | Slikta et al. |
| 7,072,809 B2 | 7/2006 | Egermann et al. |
| 7,084,094 B2 | 8/2006 | Gunn et al. |
| 7,132,456 B2 | 11/2006 | Gillig et al. |
| 7,165,613 B2 | 1/2007 | Chan et al. |
| 7,199,197 B2 | 4/2007 | Caldwell et al. |
| 7,256,160 B2 | 8/2007 | Crews |
| 7,417,099 B2 | 8/2008 | Savu et al. |
| 7,585,817 B2 | 9/2009 | Pope et al. |
| 7,727,710 B2 | 6/2010 | Haddad et al. |
| 7,772,162 B2 | 8/2010 | Pope et al. |
| 7,855,167 B2 | 12/2010 | Michnick et al. |
| 8,043,998 B2 | 10/2011 | Pope et al. |
| 8,138,127 B2 | 3/2012 | Pope et al. |
| 2001/0016562 A1 | 8/2001 | Muir et al. |
| 2003/0092581 A1 | 5/2003 | Crews |
| 2003/0114315 A1 | 6/2003 | Schwartz et al. |
| 2004/0186254 A1 | 9/2004 | Fan et al. |
| 2006/0264334 A1 | 11/2006 | Gupta et al. |
| 2007/0015669 A1 | 1/2007 | Zhang |
| 2007/0029085 A1 | 2/2007 | Panga et al. |
| 2007/0225176 A1 | 9/2007 | Pope et al. |
| 2008/0047706 A1 | 2/2008 | Pope et al. |
| 2008/0051300 A1 | 2/2008 | Pope et al. |
| 2008/0051551 A1 | 2/2008 | Pope et al. |
| 2010/0167964 A1* | 7/2010 | Pope et al. ............ 507/205 |

FOREIGN PATENT DOCUMENTS

| | | |
|---|---|---|
| EP | 1 999 339 | 12/2008 |
| EP | 2 054 485 | 5/2009 |
| EP | 2 132 240 | 12/2009 |
| JP | 3-219248 | 9/1991 |
| JP | 7-101803 | 4/1995 |
| JP | 8-193021 | 7/1996 |
| RU | 2066744 | 9/1996 |
| RU | 2164291 | 3/2001 |
| SU | 1508967 A3 | 9/1989 |
| WO | 98/02636 A1 | 1/1998 |
| WO | 03/089540 A1 | 10/2003 |
| WO | 2005/028589 A1 | 3/2005 |
| WO | 2005/035936 A1 | 4/2005 |
| WO | 2005/100007 A1 | 10/2005 |
| WO | 2006/028608 A1 | 3/2006 |
| WO | 2007/097975 A2 | 8/2007 |
| WO | 2007/097978 A2 | 8/2007 |
| WO | 2007126431 A1 | 11/2007 |
| WO | 2008/024868 | 2/2008 |
| WO | 2008024865 A3 | 2/2008 |
| WO | 2008/118240 A1 | 10/2008 |
| WO | 2008/118241 | 10/2008 |
| WO | 2008/118242 A1 | 10/2008 |
| WO | 2008/118243 A1 | 10/2008 |
| WO | 2008/118244 A1 | 10/2008 |
| WO | 2008118239 A1 | 10/2008 |
| WO | 2009085936 A1 | 7/2009 |

OTHER PUBLICATIONS

Al-Anazi et al., "Laboratory Measurements of Condensate Blocking and Treatment for Both Low and High Permeability Rocks", 2002, SPE 77546, Society of Petroleum Engineers Inc., pp. 1-9.

Al-Anazi et al., "A Successful Methanol Treatment in a Gas-Condensate Reservoir: Field Application", Mar. 2003, SPE 80901, Society of Petroleum Engineers Inc., pp. 1-9.

Al-Anazi, "Experimental Measurements of Condensate Blocking and Treatments in Low and High Permeability Cores" (Thesis), Dec. 2003, pp. 1-474.

Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.

Ayyalasomayajula, "Prediction of Bulk and Interfacial Thermodynamic Properties of Polar Mixtures by Statistical Associating Fluid Theory" (Thesis), May 2003, pp. 1-268.

Bang, "Phase Behavior Study of Hydrocarbon-Water-Alcohol Mixtures" (Thesis) May 2005, pp. 1-138.

Chowdhury, "Reservoir Simulation of Asphaltene Precipitation and of Gas Condensates" (Thesis), Dec. 2003, pp. 1-227.

Chowdhury et al., "A Semi-Analytical Method to Predict Well Deliverability in Gas-Condensate Reservoirs", Sep. 2004, SPE 90320, Society of Petroleum Engineers Inc., pp. 1-13.

Crema et al., "Foaming of Anhydrous Methanol for Well Stimulation", Apr. 1985, SPE 13565, Society of Petroleum Engineers Inc., 4 pages.

Du et al., "Use of Solvents to Improve the Productivity of gas Condensate Wells", Oct. 2000, SPE 62935, Society of Petroleum Engineers Inc., pp. 1-8.

Extended European Search Report for EP 07870112.5, dated Jul. 1, 2011.

Extended European Search Report for EP 07870115, dated Aug. 5, 2010.
Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.
Gadde et al., "Modeling Proppant Settling in Water-Fracs", Sep. 2004, SPE 89875, Society of Petroleum Engineers Inc., pp. 1-10.
International Search Report and Written Opinion for PCT/US2007/089181, dated Jun. 11, 2008.
International Search Report and Written Opinion for PCT/US2007/089182, dated Jul. 1, 2008.
Kumar, "A Simulation Study of Carbon Sequestration in Deep Saline Aquifers" (Thesis), Aug. 2004, pp. 1-192.
Lee, "Phase Equilibria in Systems Containing Hydrocarbon, Water and Methanol" (Thesis), May 2003, pp. 1-92.
Li, K., et al., "Experimental Study of Wettability Alteration to Preferential Gass-Wetting in Porous Media and Its Effects," SPE Reservoir Eval and Eng (2000), 3:139-149.
Mahadevan et al., "Clean-up of Water Blocks in Low Permeability Formations", Oct. 2003, SPE 84216, Society of Petroleum Engineers Inc., pp. 1-8.
Mahadevan et al., "Evaporative Clean-up of Water-Blocks in Gas Wells", Apr. 2005, SPE 94215, Society of Petroleum Engineers Inc., pp. 1-11.
Narayanaswamy et al., "Effect of Heterogeneity on the Non-Darcy Flow Coefficient", Mar. 1998, SPE 39979, Society of Petroleum Engineers Inc., pp. 1-17.
Nasr-El-Din et al., "Surface tension of HCl-based stimulation fluids at high temperatures", Jun. 2004, Journal of Petroleum Science and Engineering, vol. 43(1-2), pp. 57-73.
Ortiz et al., "Low-pH methanol: an alternative for stimulation in water-sensitive, tight, dirty sandstones", 1986, SPE Production Engineering (0885-9221), vol. 1(3). pp. 195-202.
Parekh et al., "Cleanup of Water Blocks in Depleted Low-Permeability Reservoirs", Sep. 2004, SPE 89837, Society of Petroleum Engineers Inc., pp. 1-12.
Pope et al., "Modeling Relative Permeability Effects in Gas-Condensate Reservoirs using a New Trapping Model", Sep. 1998, SPE 49266, Society of Petroleum Engineers Inc., pp. 1-8.
Product Information: 3M™ Novec Fluorosurfactant FC-4430, Oct. 2005, 6 pages.
Product Information: 3M™ Novec Fluorosurfactant FC 4432, Oct. 2005, 6 pages.
Product Information: 3M™ Novec Fluorosurfactant FC 4434, Jan. 2005, 4 pages.
Rai, "Parametric Study of Relative Permeability Effects on Gas-Condensate core Floods and Wells" (Thesis), Dec. 2003, pp. 1-319.
Sharma, "Modeling Gas Condensate Reservoirs and Development of a New Hybrid Well Model" (Thesis), May 2003, pp. 1-231.
Sharma et al., "Slick Water and Hybrid Fracs in the Bossier: Some Lessons Learnt", Sep. 2004, SPE 89876, Society of Petroleum Engineers Inc., pp. 1-12.
Extended European Search Report for EP 07870113.3, dated Feb. 9, 2010.
Extended European Search Report for EP 07870110.9, dated Jul. 1, 2011.
Tang, G-Q., et al., "Relative Permeability Modification in Gas-Liquid Systems Through Wettability Alteration to Intermediate Gas-Wetting," Oct. 2000, SPE 62934, Society of Petroleum Engineers Inc., pp. 1-15.
U.S. Department of Energy, "Comments on the Outlook for Balancing Natural Gas Supply and Demand, EPAct Section 1818: Natural Gas Shortage Report," http://www.fossil.energy.gov/epact/Section_1818/comments.html, accessed Mar. 16, 2008.
Wu et al., "Modeling Non-Equilibrium Mass Transfer Effects for a Gas Condensate Field", Mar. 1998, SPE 39764, Society for Petroleum Engineers Inc., pp. 1-16.
International Search Report and Written Opinion for PCT/US2007/076562, dated Sep. 22, 2008.
Written Opinion for PCT/US2007/089182, dated Jul. 1, 2008.
Written Opinion for PCT/US2007/089180, dated Jun. 11, 2008.
Extended European Search Report for EP 07870111, dated Jun. 30, 2011.
Extended European Search Report for EP 07870114, dated Dec. 13, 2011.
US 6,492,477, 12/2002, Savu et al. (withdrawn)

* cited by examiner

METHODS FOR IMPROVING THE PRODUCTIVITY OF OIL PRODUCING WELLS

CROSS REFERENCE TO RELATED APPLICATIONS

This application is a national stage filing under 35 U.S.C. 371 of PCT/US2008/084719, filed Nov. 25, 2008, which claims priority to U.S. Provisional Application No. 60/991,590, filed Nov. 30, 2007, the disclosure of which is incorporated by reference in its entirety herein.

BACKGROUND ART

It is known in the subterranean well drilling art that in some wells (e.g., some oil wells) brine is present in hydrocarbon-bearing geological formations in the vicinity of the wellbore (also known in the art as the "near wellbore region"). The brine may be naturally occurring (e.g., connate water) and/or may be a result of operations conducted on the well.

In the case of some wells (e.g., some oil wells), two phases (i.e., an oil phase and a gas phase) may form in the near wellbore region as the pressure falls below the saturation pressure (bubble point) of the oil. The presence of gas can cause a large decrease in relative permeability to oil, and thus the productivity of the well decreases.

The presence of brine and/or the presence of two phases in a near wellbore region of an oil well can inhibit or stop production of hydrocarbons from the well, and hence is typically undesirable. Conventional treatments for increasing the hydrocarbon production from such wells (e.g., a fracturing and propping operation or a solvent flush) often achieve limited success. For example, fluids used in a fracturing operation can be difficult to clean up once the operation has been carried out. Hence, there is a continuing need for alternative and/or improved techniques for increasing the productivity of oil wells that have brine and/or two phases present in a near wellbore region of a hydrocarbon-bearing geological formation.

DISCLOSURE OF THE INVENTION

In one aspect, the present disclosure provides a method of treating a formation bearing oil and brine, the method comprising:
contacting the formation with a composition comprising solvent and a nonionic polymer,
wherein the nonionic polymer comprises:
at least one divalent unit represented by formula:

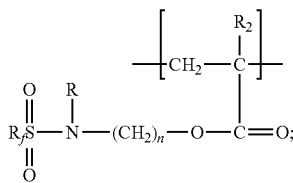

and
a poly(alkyleneoxy) segment;
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10;
wherein the solvent at least one of at least partially solubilizes or at least partially displaces at least one of the oil or the brine in the formation, wherein the oil is at least one of black oil or volatile oil, and wherein the formation has at least one of an oil permeability or a fracture conductivity that is increased after the composition contacts the formation.

In some embodiments, the nonionic polymer comprises at least one divalent unit represented by a formula:

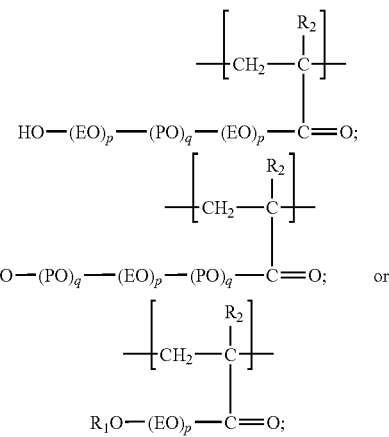

wherein
$R_1$ and $R_2$ are each independently hydrogen or alkyl of 1 to 4 carbon atoms;
EO represents —$CH_2CH_2O$—;
each PO independently represents —$CH(CH_3)CH_2O$— or —$CH_2CH(CH_3)O$—;
each p is independently an integer of 1 to about 128; and
each q is independently an integer of 0 to about 55.

In some embodiments, the oil is volatile oil. In some embodiments, the solvent comprises at least one of a polyol or polyol ether, wherein the polyol and polyol ether independently have from 2 to 25 carbon atoms. In some embodiments, the solvent comprises at least one monohydroxy alcohol, ether, or ketone, each independently having up to 4 carbon atoms. In some embodiments, the method further comprises contacting the formation with a fluid prior to contacting the formation with the composition, wherein the fluid at least one of at least partially solubilizes or at least partially displaces the brine in the formation. In some embodiments, the formation has at least one fracture. In some of these embodiments, the fracture has a plurality of proppants therein. In some embodiments, $R_f$ is perfluorobutyl. In some embodiments, the formation is a clastic formation.

In another aspect, the present disclosure provides a formation bearing oil and brine, wherein the formation is penetrated by a well bore, wherein the oil is at least one of black oil or volatile oil, and wherein a region of the formation near the well bore is treated according to any of the methods disclosed herein. In some embodiments, the formation is downhole. In some embodiments, the formation is a clastic formation, and the nonionic polymer is adsorbed on the clastic formation. In some embodiments, the formation has at least one fracture, wherein the fracture has a plurality of proppants, and wherein the nonionic polymer is adsorbed on at least a portion of the plurality of proppants.

In another aspect, the present disclosure provides a method of making a composition, the method comprising:
selecting a geological zone of a formation bearing at least one of black oil or volatile oil, the geological zone having a temperature, a hydrocarbon composition, and a brine composition;

receiving data comprising the temperature, the hydrocarbon composition, and the brine composition of the geological zone of the formation;
generating a formulation comprising a nonionic polymer and solvent, wherein the nonionic polymer comprises at least one divalent unit represented by formula:

$$\left[ CH_2 - \underset{|}{\overset{R_2}{C}} \right]$$
$$\underset{\underset{O}{\parallel}}{R_fS} - \underset{|}{\overset{R}{N}} - (CH_2)_n - O - \overset{}{C} = O;$$

and
 a poly(alkyleneoxy) segment;
 wherein
  $R_f$ represents a perfluoroalkyl group having from 1 to 8 carbon atoms;
  R and $R_2$ are each independently hydrogen or alkyl of 1 to 4 carbon atoms; and
  n is an integer from 2 to 10;
wherein the formulation is generated based at least in part on compatibility information concerning the nonionic polymer, the solvent, the temperature, and at least one of the hydrocarbon composition or brine composition of the geological zone of the formation; and
 making a composition according to the formulation.

In some embodiments of the method of making a composition according to the present disclosure, the nonionic polymer comprises at least one divalent unit represented by a formula:

$$\left[ CH_2 - \underset{|}{\overset{R_2}{C}} \right]$$
$$HO-(EO)_p-(PO)_q-(EO)_p-C=O;$$

$$\left[ CH_2 - \underset{|}{\overset{R_2}{C}} \right]$$
$$HO-(PO)_q-(EO)_p-(PO)_q-C=O; \quad \text{or}$$

$$\left[ CH_2 - \underset{|}{\overset{R_2}{C}} \right]$$
$$R_1O-(EO)_p-C=O;$$

wherein
 $R_1$ and $R_2$ are each independently hydrogen or alkyl of 1 to 4 carbon atoms;
 EO represents —$CH_2CH_2O$—;
 each PO independently represents —$CH(CH_3)CH_2O$— or —$CH_2CH(CH_3)O$—;
 each p is independently an integer of 1 to about 128; and
 each q is independently an integer of 0 to about 55.

In some embodiments, the solvent comprises at least one of a polyol or polyol ether, and wherein the polyol and polyol ether independently have from 2 to 25 carbon atoms. In some embodiments, the solvent comprises at least one monohydroxy alcohol, ether, or ketone, each independently having up to 4 carbon atoms.

In other aspects, the present disclosure provides a composition made according to the method of making a composition disclosed herein and a method of treating a formation bearing at least one of black oil or volatile oil, the method comprising contacting the formation with a composition made according to the method of making a composition disclosed herein.

In another aspect, the present disclosure provides a method of treating a formation bearing oil and brine, wherein the oil is at least one of black oil or volatile oil, wherein the formation has at least one fracture, wherein the fracture has a plurality of proppants therein, and wherein the fracture has a conductivity, the method comprising:
 contacting at least one of the fracture or at least a portion of the plurality of proppants with an amount of a composition comprising solvent and a nonionic polymer, wherein the nonionic polymer comprises:
 at least one divalent unit represented by formula:

$$\left[ CH_2 - \underset{|}{\overset{R_2}{C}} \right]$$
$$\underset{\underset{O}{\parallel}}{R_fS} - \underset{|}{\overset{R}{N}} - (CH_2)_n - O - \overset{}{C} = O;$$

and
 at least one divalent unit represented by formula:

$$\left[ CH_2 - \underset{|}{\overset{R_2}{C}} \right]$$
$$HO-(EO)_p-(PO)_q-(EO)_p-C=O;$$

$$\left[ CH_2 - \underset{|}{\overset{R_2}{C}} \right]$$
$$HO-(PO)_q-(EO)_p-(PO)_q-C=O; \quad \text{or}$$

$$\left[ CH_2 - \underset{|}{\overset{R_2}{C}} \right]$$
$$R_1O-(EO)_p-C=O;$$

wherein
 $R_f$ represents a perfluoroalkyl group having from 1 to 8 carbon atoms;
 R, $R_1$, and $R_2$ are each independently hydrogen or alkyl of 1 to 4 carbon atoms;
 n is an integer from 2 to 10;
 EO represents —$CH_2CH_2O$—;
 each PO independently represents —$CH(CH_3)CH_2O$— or —$CH_2CH(CH_3)O$—;
 each p is independently an integer of from 1 to about 128; and
 each q is independently an integer of from 0 to about 55,
wherein the solvent at least one of at least partially solubilizes or at least partially displaces at least one of the oil or the brine in the fracture, and wherein after the composition contacts at least one of the fracture or at least a portion of the plurality of proppants, the conductivity of the fracture is increased. In some embodiments, the formation is a clastic formation. In some embodiments, the formation is a nonclastic formation. In some embodiments, the oil is volatile oil. In some embodiments, the solvent comprises at least one of a polyol or polyol ether, wherein the polyol and polyol ether independently have from 2 to 25 carbon atoms. In some embodiments, the solvent comprises at least one monohydroxy alcohol, ether, or ketone, each independently having up to 4 carbon atoms. In some embodiments, the method further comprises contacting the fracture with a fluid prior to contacting the fracture with the composition, wherein the fluid at least one of at least partially solubilizes or at least partially displaces the brine in the fracture. In some embodiments, $R_f$ is perfluorobutyl.

Embodiments of methods for treating formations bearing oil and brine according to the present disclosure may be useful, for example, for recovering hydrocarbons (e.g., hydrocarbons having from 1, 2, 3, 4, or 5 carbon atoms up to about 30, 35, 40, 45, 50 or more carbon atoms including aliphatics, aromatics, and combinations thereof) from subterranean geological formations (in some embodiments, clastic fomations).

Treatment methods according to the present disclosure are typically useful, for example, for increasing the productivity of oil wells that have brine and/or have a gas present in a near wellbore region of a oil-bearing formation. Typically, after treatment according to the present disclosure, oil is obtained from the wellbore at an increased rate, as compared the rate prior to treatment. The treatment methods disclosed herein increase at least the oil permeability of the formation by at least 25, 50, 75, 100, 125, 150, 175, or even at least 200 percent. In some embodiments, the treatment methods disclosed herein increase at least the oil permeability of the formation by at least 160, 165, 170, 175, 180, 185, 190, or even at least 200 percent. Typically, and surprisingly, the compositions disclosed herein are even more effective for treating formations (e.g., clastic formations) bearing brine and oil (in some embodiments, volatile oil) than for treating formations having brine and retrograde condensate.

DESCRIPTION OF THE DRAWINGS

For a more complete understanding of the features and advantages of the present disclosure, reference is now made to the detailed description along with the accompanying figures and in which.

DESCRIPTION OF THE INVENTION

Figure 1:
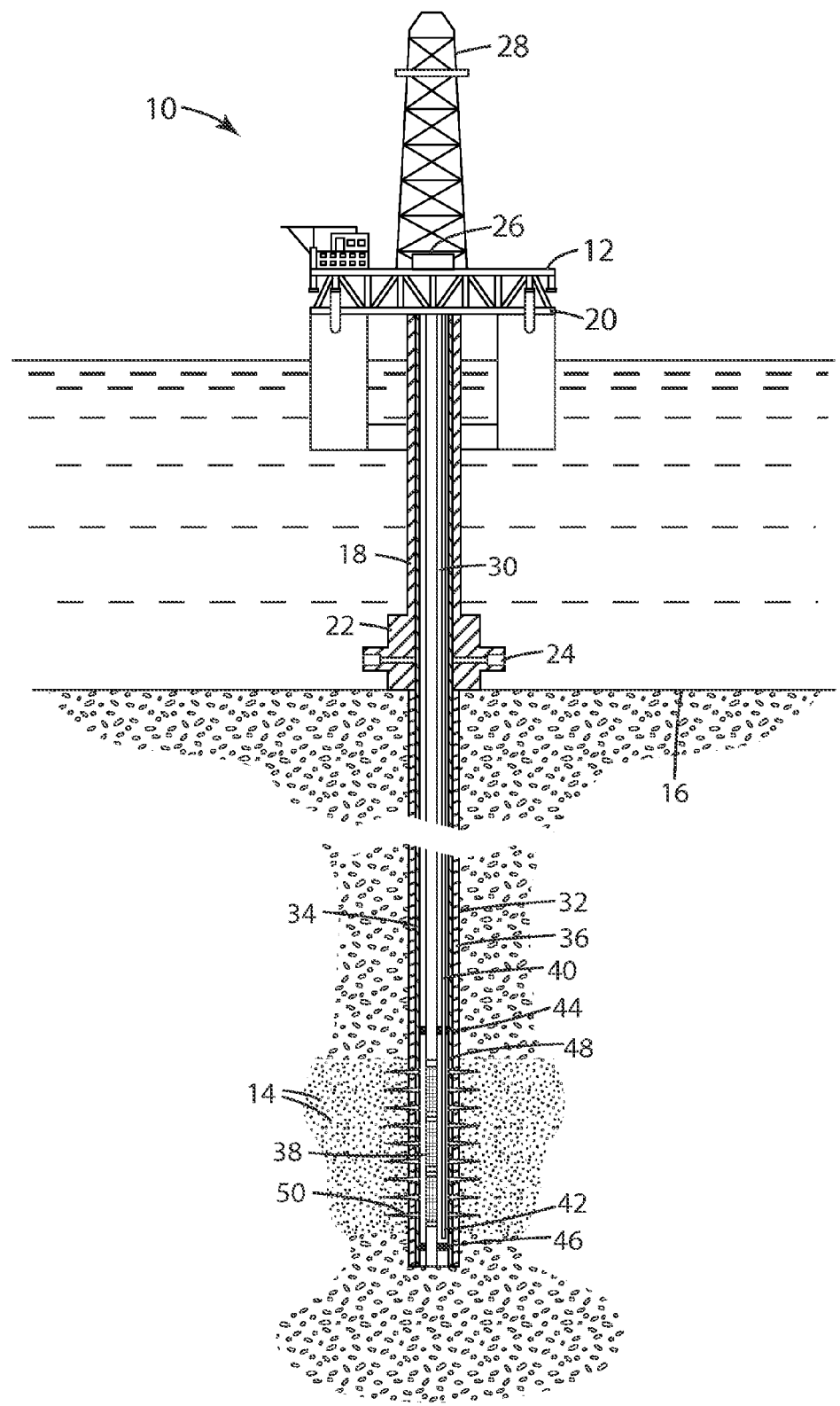
FIG. 1 is a schematic illustration of an exemplary embodiment of an offshore oil platform operating an apparatus for progressively treating a near wellbore region according to the present disclosure.

To facilitate the understanding of this disclosure, a number of terms are defined below. Terms defined herein have meanings as commonly understood by a person of ordinary skill in the areas relevant to the present disclosure. Terms such as "a", "an", "at least one", and "the" are not intended to refer to only a singular entity, but include the general class of which a specific example may be used for illustration. The phrase "at least one of an oil permeability or a fracture conductivity that is increased" refers to the fact that either the oil permeability, the fracture conductivity, or both are increased. The terminology herein is used to describe specific embodiments of the disclosure, but their usage does not delimit the invention, except as outlined in the claims.

The following definitions of terms apply throughout the specification and claims.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "formation" (including "clastic formation") includes both hydrocarbon-bearing formations in the field (i.e., subterranean hydrocarbon-bearing formations) and portions of such hydrocarbon-bearing formations (e.g., core samples).

The term "nonionic" refers to being free of ionic groups (e.g., salts) or groups (e.g., $-CO_2H$, $-SO_3H$, $-OSO_3H$, $-P(=O)(OH)_2$) that are readily substantially ionized in water.

The term "normal boiling point" refers to the boiling point at a pressure of one atmosphere (100 kPa).

The term "polymer" refers to a molecule of molecular weight of at least 1000 grams/mole, the structure of which essentially includes the multiple repetition of units derived, actually or conceptually, from molecules of low relative molecular mass.

The term "solvent" refers to a homogenous liquid material (inclusive of any water with which it may be combined) that is capable of at least partially dissolving the nonionic polymer(s) with which it is combined at 25° C.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

Methods according to some aspects of the present disclosure are useful for treating formations (e.g., clastic formations) bearing oil and brine. The brine present in the formation may be from a variety of sources including at least one of connate water, flowing water, mobile water, immobile water, residual water from a fracturing operation or from other downhole fluids, or crossflow water (e.g., water from adjacent perforated formations). In some embodiments, the brine is connate water. The term "oil" can be understood as a fluid in a pressure vs. temperature phase diagram which lies to the left of the critical point. In this application, the term "oil" excludes gas condensates. The term "black oil" refers to the class of crude oil typically having gas-oil ratios (GOR) less than about 2000 scf/stb (356 m³/m³). For example, a black oil may have a GOR in a range from about 100 (18), 200 (36), 300 (53), 400 (71), or even 500 scf/stb (89 m³/m³) up to about 1800 (320), 1900 (338), or even 2000 scf/stb (356 m³/m³). The term "volatile oil" refers to the class of crude oil typically having a GOR in a range between about 2000 and 3300 scf/stb (356 and 588 m³/m³). For example, a volatile oil may have a GOR in a range from about 2000 (356), 2100 (374), or even 2200 scf/stb (392 m³/m³) up to about 3100 (552), 3200 (570), or even 3300 scf/stb (588 m³/m³). The phrase "at least one of black oil or volatile oil" refers to the fact that the oil can be black oil, volatile oil, or a combination of black oil and volatile oil.

In some embodiments, treatment methods according to present disclosure are used to treat clastic formations (e.g., shale, conglomerate, diatomite, sand, and sandstone). In some embodiments, the clastic formation is predominantly sandstone (i.e., at least 50 percent by weight sandstone).

Treatment methods according to the present disclosure may be practiced, for example, in a laboratory environment (e.g., on a core sample (i.e., a portion) of an oil-bearing formation or in the field (e.g., on a subterranean oil-bearing formation situated downhole)). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to oil-bearing formations having these conditions. In the field, the treatment compositions may be injected into formations bearing oil and brine using methods (e.g., by pumping under pressure) well known to those skilled in the oil and gas art.

Methods of using treatment compositions described herein are useful, for example, on both existing and new wells. Typically, it is believed to be desirable to allow for a shut-in time after compositions described contact the formation (and/or proppants) Exemplary set in times include a few hours (e.g., 1 to 12 hours), about 24 hours, or even a few (e.g., 2 to 10) days.

The skilled artisan, after reviewing the instant disclosure, will recognize that various factors may be taken into account in practice of the any of the disclosed methods including, for example, the ionic strength of the composition, pH (e.g., a range from a pH of about 4 to about 10), and the radial stress at the wellbore (e.g., about 1 bar (100 kPa) to about 1000 bars (100 MPa)).

The present disclosure includes methods for treating geological formations bearing oil and brine with nonionic fluorinated polymers that modify the wetting properties of the rock in a near wellbore region of the geological formation to remove brine and/or hydrocarbons. Although not wanting to be bound by theory, it is believed the nonionic fluorinated polymers generally adsorb to clastic formations (and/or proppants) under downhole conditions and typically remain at the target site for the duration of an extraction (e.g., 1 week, 2 weeks, 1 month, or longer). In some embodiments of methods of treating a formation (e.g., a clastic formation) according to the present disclosure the formation is penetrated by a well bore, and a region near the well bore is contacted with the composition. In some of these embodiments, the method further comprises obtaining hydrocarbons from the well bore after contacting the formation (e.g., the clastic formation) with the composition.

In some embodiments, nonionic polymers that are useful for practicing the methods disclosed herein comprise:
at least one divalent unit represented by formula:

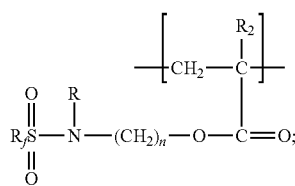

and
at least one divalent unit represented by formula:

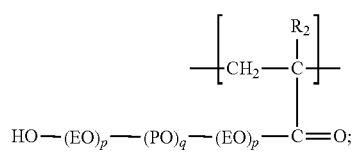

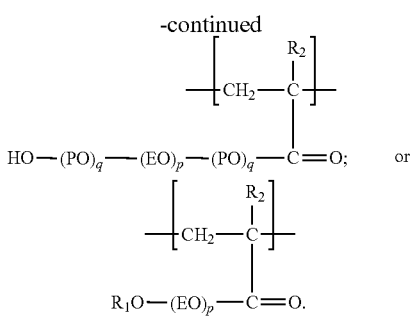

$R_f$ represents a perfluoroalkyl group having from 1 to 8 carbon atoms. Exemplary groups $R_f$ include perfluoromethyl, perfluoroethyl, perfluoropropyl, perfluorobutyl (e.g., perfluoro-n-butyl or perfluoro-sec-butyl), perfluoropentyl, perfluorohexyl, perfluoroheptyl, and perfluorooctyl. In some embodiments, $R_f$ is perfluorobutyl.

R, $R_1$, and $R_2$ are each independently hydrogen or alkyl of 1 to 4 carbon atoms (e.g., methyl, ethyl, n-propyl, isopropyl, butyl, isobutyl, or t-butyl).

n is an integer from 2 to 10 (i.e., 2, 3, 4, 5, 6, 7, 8, 9, or 10).

EO represents $-CH_2CH_2O-$.

Each PO independently represents $-CH(CH_3)CH_2O-$ or $-CH_2CH(CH_3)O-$.

Each p is independently an integer of from 1 to about 128.

Each q is independently an integer of from 0 to about 55. In certain embodiments, q may be in a range of from 1 to 55 and the ratio p/q has a value of from at least 0.5, 0.75, 1 or 1.5 to 2.5, 2.7, 3, 4, 5, or more. It is within the scope of this disclosure to use mixtures of nonionic polymers.

In some embodiments, the nonionic polymers described hereinabove are typically preparable by copolymerization of:
(a) at least one compound represented by the formula

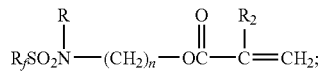

and
(b) at least one compound represented by a formula:

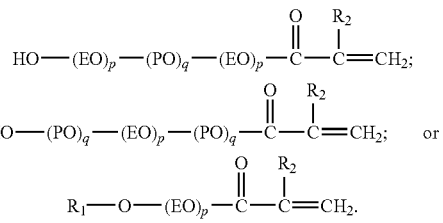

Nonionic polymers comprising a fluorinated divalent unit described above and a poly(alkyleneoxy) segment can be prepared, for example, by techniques known in the art (e.g., by free radical initiated copolymerization of a nonafluorobutanesulfonamido group-containing acrylate with a poly(alkyleneoxy) acrylate (e.g., monoacrylate or diacrylate) or mixtures thereof). Adjusting the concentration and activity of the initiator, the concentration of monomers, the temperature, and the chain-transfer agents can control the molecular weight of the polyacrylate copolymer. The description of the preparation of such polyacrylates is described, for example, in U.S. Pat. No. 3,787,351 (Olson), the disclosure of which is incorporated herein by reference. Preparation of nonafluorobutanesulfonamido acrylate monomers are described, for example, in U.S. Pat. No. 2,803,615 (Ahlbrecht et al.), the disclosure of which is incorporated herein by reference. Examples of fluoroaliphatic polymeric esters and their preparation are described, for example, in U.S. Pat. No. 6,664,354 (Savu et al.), the disclosure of which is incorporated herein by reference.

Methods described above for making nonafluorobutylsulfonamido group-containing structures can be used to make heptafluoropropylsulfonamido groups by starting with heptafluoropropylsulfonyl fluoride, which can be made, for example, by the methods described in Examples 2 and 3 of U.S. Pat. No. 2,732,398 (Brice et al.), the disclosure of which is incorporated herein by reference.

Useful nonionic polymers typically have a number average molecular weight in the range of from 1,000 up to 10,000 grams/mole, 20,000 grams/mole, 30,000 grams/mole, 40,000 grams/mole, 50,000 grams/mole, 60,000 grams/mole, 70,000 grams/mole, 80,000 grams/mole, 90,000 grams/mole, or even up to 100,000 grams/mole. Nonionic polymers having higher or lower molecular weights may also be useful.

In some embodiments, the nonionic polymer is free of hydrolyzable silane groups. This may be advantageous, for example, in prolonging the storage-life of the composition. The term "hydrolyzable silane group" refers to a group having at least one Si—O—Z moiety that undergoes hydrolysis with water at a pH between about 2 and about 12, wherein Z is H or substituted or unsubstituted alkyl or aryl.

Typically, compositions useful for practicing the treatment methods and the methods of making a composition disclosed herein include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of the nonionic polymer, based on the total weight of the composition. For example, the amount of the nonionic polymer in the compositions may be in a range of from 0.01 to 10, 0.1 to 10, 0.1 to 5, 1 to 10, 1 to 5, or even in a range from 0.5 to 5 percent, based on the total weight of the composition. Lower and higher amounts of the nonionic polymer in the compositions may also be used, and may be desirable for some applications.

The ingredients for compositions described herein including nonionic polymers, solvents, and optionally water can be combined using techniques known in the art for combining these types of materials, including using conventional magnetic stir bars or mechanical mixer (e.g., in-line static mixer and recirculating pump).

Compositions useful in practicing the treatment methods and the methods of making a composition disclosed herein comprise solvent. Examples of useful solvents include organic solvents, water, and combinations thereof. In some embodiments of these methods, the compositions comprise at least two organic solvents. In other embodiments, the compositions further comprise water (e.g., in the solvent). In other embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents such as, for example: monohydroxy alcohols having from 1 to 4 or more carbon atoms such as, for example, methanol, ethanol, isopropanol, propanol, or butanol; polyols such as, for example, glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or polypropylene glycol)), triols (e.g., glycerol, trimethylolpropane), or pentaerythritol; ethers such as, for example, diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof In some embodiments of the treatment methods and the methods of making a composition disclosed herein, the solvent comprises at least one of a polyol or polyol ether independently having from 2 to 25 carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 20, 2 to 15, 2 to 10, 2 to 8, or even 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 8, or even from 5 to 8 carbon atoms. In some embodiments, the polyol is at least one of ethylene glycol, propylene glycol, polypropylene glycol), 1,3-propanediol, or 1,8-octanediol, and the polyol ether is at least one of 2-butoxyethanol, diethylene glycol monomethyl ether, ethylene glycol monobutyl ether, or dipropylene glycol monomethyl ether. In some embodiments, the polyol and/or polyol ether has a normal boiling point of less than 450° F. (232° C.), which may be useful, for example, to facilitate removal of the polyol and/or polyol ether from a well after treatment.

In some embodiments, useful solvents for practicing any of the methods disclosed herein comprise at least one monohydroxy alcohol, ether, or ketone, each independently having up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing any of the methods disclosed herein comprise at least one of methanol, ethanol, isopropanol, tetrahydrofuran, or acetone.

In some embodiments of the treatment methods and methods of making a composition disclosed herein, the solvent comprises at least one of a polyol or polyol ether independently having from 2 to 25 carbon atoms and at least one monohydroxy alcohol, ether, or ketone each independently having up to 4 carbon atoms. In these embodiments, in the event that a component of the solvent is a member of two functional classes, it may be used as either class but not both. For example, ethylene glycol methyl ether may be a polyol ether or a monohydroxy alcohol, but not as both simultaneously. Useful combinations of two solvents include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent. Several compositions including a nonionic polymer, at least one of a polyol or polyol ether independently having from 2 to 25 carbon atoms, and at least one monohydroxy alcohol, ether, or ketone each independently having up to 4 carbon atoms are disclosed in U.S. Pat. App. Pub. No. US 2008/0051551 (Pope et al.), the disclosure of which is incorporated herein by reference.

In some embodiments, the solvent consists essentially of (i.e., does not contain any components that materially affect water solubilizing or displacement properties of the composition under downhole conditions) at least one of a polyol having from 2 to 25 carbon atoms or polyol ether having from 2 to 25 carbon atoms, and at least one monohydroxy alcohol having from 1 to 4 carbon atoms, ether having from 2 to 4 carbon atoms, or ketone having from 3 to 4 carbon atoms.

For the compositions useful for practicing the treatment methods disclosed herein, the solvent at least partially solubilizes and/or at least partially displaces brine and/or oil in the formation. In some embodiments, the solvent at least one of at least partially solubilizes or displaces brine in the formation. In some embodiments, the solvent at least one of at least partially solubilizes or displaces oil in the formation. In some embodiments, the solvent at least one of at least partially solubilizes or at least partially displaces the brine and the oil in the formation.

Each solvent component may be present as a single component or a mixture of components. The amount of solvent typically varies inversely with the amount of other components in compositions useful in practicing any of the methods disclosed herein. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

Generally, the amount of the nonionic polymer and solvent (and type of solvent) is dependent on the particular application since conditions typically vary between wells, at different depths of individual wells, and even over time at a given location in an individual well. Advantageously, treatment methods according to the present disclosure can be customized for individual wells and conditions.

The effectiveness of treatment compositions for improving hydrocarbon productivity of a particular oil well having brine accumulated in the near wellbore region will typically be determined by the ability of the composition to dissolve the quantity of brine present in the near wellbore region of the well. Hence, at a given temperature greater amounts of compositions having lower brine solubility (i.e., compositions that can dissolve a relatively lower amount of brine) will typically be needed than in the case of compositions having higher brine solubility and containing the same nonionic polymer at the same concentration.

Without wishing to be bound by theory, it is believed that more desirable well treatment results are obtained when the composition used in a particular near wellbore region of a well is homogeneous at the temperature(s) encountered in the near wellbore region. Accordingly, a composition selected to treat the near wellbore region of a hydrocarbon-bearing formation is typically homogeneous at at least one temperature found in the near wellbore region. In some embodiments, the nonionic polymer has a cloud point that is above the temperature in the formation (e.g., the clastic formation). The term "cloud point" refers to the temperature at which the nonionic polymer becomes non-homogeneous. This temperature can depend on many variables (e.g., concentration of the nonionic polymer, solvent composition, brine concentration and composition, oil concentration and composition, and the presence of other components (e.g., surfactants)).

In some embodiments of the methods of treating formations disclosure herein, when the composition is contacting the formation (e.g., the clastic formation), the formation is substantially free of precipitated solids (e.g., salts or asphaltenes). The formation may be considered "substantially free of precipitated solids" when the amount of solid is low enough such that the solid does not interfere with the interaction (e.g., adsorption) of the nonionic polymer with the formation. The formation may also be considered substantially free of precipitated solids if the amount of precipitated solid is less than 5% higher than the solubility product at a given temperature and pressure. In some embodiments, the formation is substantially free of precipitated salts (e.g., from the brine) in the formation.

Methods of making a composition according to the present disclosure include receiving (e.g., obtaining or measuring) data comprising the temperature, the hydrocarbon composition, and the brine composition of a selected geological zone of a formation bearing oil and brine. These data can be obtained or measured using techniques well known to one of skill in the art. The methods of making a composition disclosed herein also include generating a formulation based at least in part on compatibility information concerning the nonionic polymer, the solvent, the temperature, and at least one of the hydrocarbon composition or brine composition of the selected geological zone of the formation. In some embodiments, the compatibility information comprises information concerning phase stability of a mixture of the nonionic polymer, the solvent, and a model brine composition, wherein the model brine composition is based at least partially on the brine composition of the geological zone of the formation. In some embodiments, the compatibility information comprises information concerning solid precipitation from a mixture of the nonionic polymer, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation.

The phase stability of a solution or dispersion can be evaluated by obtaining a sample of the brine from the formation and/or analyzing the composition of the brine from the formation and preparing a model brine having the same or similar composition as the brine in the formation. The brine and the treatment composition (containing a nonionic polymer and solvent) can be combined (e.g., a in container) at the temperature and then mixed together (e.g., by shaking or stirring). The mixture can then be visually evaluated to see if it phase separates. Similarly, a model hydrocarbon composition (based at least in part on the hydrocarbon composition of the formation) and/or brine can be combined to determine if solid (e.g., salt or asphaltenes) precipitates from the mixture. Several examples of compatibility evaluations of brines and compositions containing a nonionic polymer and at least one of solvent or water can be found in Int. Pat. Appl. Pub. No. WO 2008/024868 (Pope, et al.), the disclosure of which is incorporated herein by reference.

In some embodiments of methods of making a composition according to the present disclosure, combining the composition and the brine of the selected geological zone of the formation at the temperature of the formation provides one liquid phase (e.g., the nonionic polymer has a cloud point that is above the temperature of the formation). The phase behavior of the composition and the brine can be evaluated over an extended period of time (e.g., 1 hour, 12 hours, 24 hours or longer) to determine if any phase separation or cloudiness is observed.

By adjusting the relative amounts of brine and/or hydrocarbon and the nonionic polymer and solvent and/or water formulation, it is possible to determine the maximum brine and/or hydrocarbon uptake capacity (above which phase separation or solid precipitation occurs) of the formulation at a given temperature. Varying the temperature at which the compatibility information is obtained typically results in a more complete understanding of the suitability of formulations as treatment compositions for a given well. It is also contemplated that one may be able obtain the compatibility information, in whole or in part, by computer simulation or by referring to previously determined, collected, and/or tabulated information (e.g., in a handbook or a computer database).

In some embodiments of treatment methods according to the present disclosure, the method comprises contacting the formation (e.g., the clastic formation) with a fluid prior to contacting the formation with the composition. In some of these embodiments, the fluid partially solubilizes the brine. In some embodiments, the fluid partially displaces the brine. The fluid may be useful for decreasing the concentration of at least one salt present in the brine prior to introducing the composition to the formation. In some embodiments, the fluid at least one of at least partially solubilizes or displaces the oil in the formation. In some embodiments, the fluid is essentially free of nonionic polymers. The term "essentially free of nonionic fluorinated polymers" refers to fluid that may have a fluorinated polymer in an amount insufficient for the fluid to have a cloud point (e.g., when it is below its critical micelle concentration). A fluid that is essentially free of nonionic fluorinated polymers may be a fluid that has a nonionic fluorinated polymer but in an amount insufficient to alter the wettability of, for example, a hydrocarbon-bearing formation under downhole conditions. A fluid that is essentially free of nonionic fluorinated polymers includes those that have a weight percent of such polymers as low as 0 weight percent.

In some embodiments, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether, and wherein the polyol and polyol ether independently have from 2 to 25 carbon atoms. In some embodiments, useful polyols have 2 to 20, 2 to 15, 2 to 10, 2 to 8, or even 2 to 6 carbon atoms. Exemplary useful polyols include ethylene glycol, propylene glycol, polypropylene glycol), 1,3-propanediol, trimethylolpropane, glycerol, pentaerythritol, and 1,8-octanediol. In some embodiments, useful polyol ethers may have from 3 to 25 carbon atoms, 3 to 20, 3 to 15, 3 to 10, 3 to 8, or even from 5 to 8 carbon atoms. Exemplary useful polyol ethers include diethylene glycol monomethyl ether, ethylene glycol monobutyl ether, dipropylene glycol monomethyl ether, and 2-butoxyethanol. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments of the treatment methods disclosed herein, the formation (e.g., the clastic formation) has at least one fracture. In some embodiments, fractured formations have at least 2, 3, 4, 5, 6, 7, 8, 9, or even 10 or more fractures. As used herein, the term "fracture" refers to a fracture that is man-made. In the field, for example, fractures are typically make by injecting a fracturing fluid into a subterranean geological formation at a rate and pressure sufficient to open a fracture therein (i.e., exceeding the rock strength). In some of these embodiments, the fracture has a plurality of proppants therein. Prior to delivering the proppants into a fracture, the proppants may comprise less than 0.1% by weight nonionic polymers, based on the total weight of the plurality of proppants. Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

In some embodiments, the proppants form packs within a formation and/or wellbore. Proppants may be selected to be chemically compatible with the solvents and compositions described herein. Examples of particulate solids include fracture proppant materials introducible into the formation as part of a hydraulic fracture treatment and sand control particulate introducible into the wellbore/formation as part of a sand control treatment such as a gravel pack or frac pack.

In some embodiments wherein the formation treated according to the methods described herein has at least one fracture, the fracture has a volume, and the amount of the composition is based at least partially on the volume of the fracture. The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation.

In some embodiments wherein the formation treated according to the methods described herein has at least one fracture, the formation is a nonclastic formation. In some of these embodiments, the formation is predominantly limestone (i.e., at least 50 percent by weight limestone).

Various methods (e.g., pumping under pressure) known to those skilled in the oil and gas art can be used in accordance with the treatment methods disclosed herein to contact fractures in hydrocarbon-bearing subterranean formations with compositions comprising solvent and nonionic polymer(s). Coil tubing, for example, may be used to deliver the treatment composition to a particular fracture. In some embodiments, in practicing the treatment methods disclosed herein it may be desirable to isolate the fracture (e.g., with conventional packers) to be contacted with the treatment composition.

In some embodiments, wherein the formation treated according to the methods described herein has at least one fracture, the fracture has a conductivity, and after the composition contacts at least one of the fracture or at least a portion of the plurality of proppants, the conductivity of the fracture is increased (e.g., by 25, 50, 75, 100, 125, 150, 175, 200, 225, 250, 275, or even by 300 percent).

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Advantages and embodiments of the methods disclosed herein are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight. In the Tables, "nd" means not determined.

Examples

The following abbreviations are used in the examples.
$q_{pump}$ is the flow rate of the pump
$q_{total\_core}$ is the flow rate of combined gas and oil through the core
$q_{g\_core}$ is the flow rate of gas through the core
$q_{o\_core}$ is the flow rate of oil through the core
$\Delta P$ is the pressure drop across the core
$k_{rg}$ is the gas relative permeability
$k_{ro}$ is the oil relative permeability
Nc is the capillary number Nonionic Polymer:

Nonionic Polymer 1 was prepared essentially as in Examples 2A, 2B, and 4 of U.S. Pat. No. 6,664,354 (Savu), incorporated herein by reference, except using 4270 kilograms (kg) of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in the procedure of Example 2B and using 15.6 grams of 50/50 mineral spirits/TRIGONOX-21-050 organic peroxide initiator (tert-butyl peroxy-2-ethylhexanoate obtained from Akzo Nobel, Arnhem, The Netherlands) in place of 2,2'-azobisisobutyronitrile, and with 9.9 grams of 1-methyl-2-pyrrolidinone added to the charges in the procedure of Example 4.

Composition Preparation:

Nonionic Polymer 1 (1%), 2-butoxyethanol (69.5%), and ethanol (29.5%) were combined to make 400 grams of a 1% by weight solution of the polymer. The components were mixed together using a magnetic stirrer and magnetic stir bar.

Figure 2:
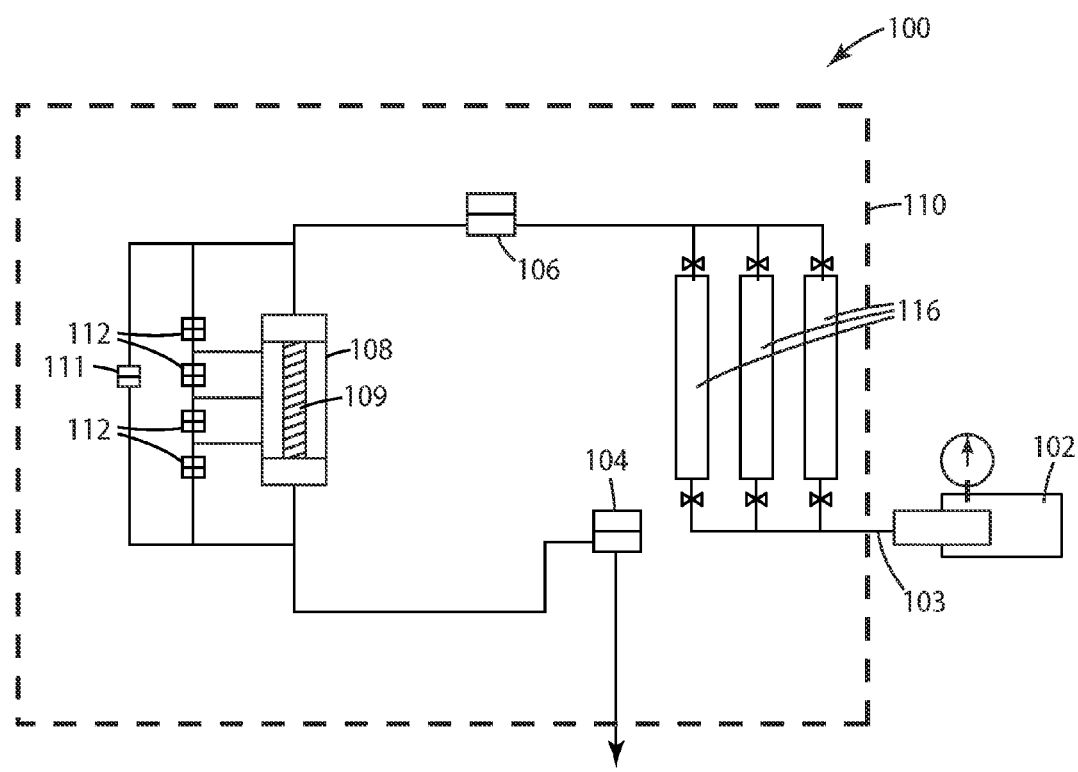
FIG. 2 is a schematic illustration of the core flood set-up used for the Example.

Core Flood Setup:

A schematic diagram of a core flood apparatus 100 used to determine relative permeability of a substrate sample (i.e., core) is shown in FIG. 2. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1x8-3K-13 obtained from Phoenix, Houston Tex.) were used to measure pressure drop across four sections (2 inches (5.1 cm) in length each) of core 109. An additional pressure port 111 on core holder 108 was used to measure pressure drop across the entire length (8 inches (20.3 cm)) of core 109. Two back-pressure regulators (Model No. BPR-50; obtained from Temco, Tulsa, Okla.) 104, 106 were used to control the flowing pressure upstream 106 and downstream 104 of core 109.

The flow of fluid was through a vertical core to avoid gravity segregation of the gas. High-pressure core holder 108, back pressure regulators 106, fluid accumulators 116, and tubing were placed inside a pressure- and temperature-controlled oven 110 (Model DC 1406F; maximum temperature rating of 650° F. (343° C.) obtained from SPX Corporation, Williamsport, Pa.) at 154° F. (67.8° C.). The maximum flow rate of fluid was 7,000 mL/hr. An overburden pressure of 3400 psig ($2.3 \times 10^7$ Pa) was applied.

Cores:

Core samples were cut from a sandstone block obtained from Cleveland Quarries, Vermillion, Ohio, under the trade designation "BEREA SANDSTONE". The properties for the core used in the example (Ex.) and comparative examples (C. E. A and C. E. B) are shown in Table 1, below.

TABLE 1

|  | Ex. | C.E. A | C.E. B |
| --- | --- | --- | --- |
| Diameter, inch (cm) | 0.99 | 1 | 1 |
|  | (2.5) | (2.54) | (2.54) |
| Length, inch (cm) | 8.0 | 8.0 | 8.0 |
|  | (20.3) | (20.3) | (20.3) |
| Dry Weight, grams | 214.4 |  |  |

TABLE 1-continued

|  | Ex. | C.E. A | C.E. B |
|---|---|---|---|
| Pore volume, mL | 20.5 | 20.6 | 20.6 |
| Porosity, % | 20.2 | 20 | 20 |

The porosity was determined from the measured mass of the dry core, the bulk volume of the core, and the grain density of quartz. The pore volume is the product of the bulk volume and the porosity. The cores described in Table 1, above, were dried for 24 hours in a standard laboratory oven at 180° C., and then were wrapped in aluminum foil and heat shrink tubing (obtained under the trade designation "TEFLON HEAT SHRINK TUBING" from Zeus, Inc., Orangeburg, S.C.). Referring again to FIG. 2, the wrapped core 109 was placed in core holder 108 inside oven 110 at 75° F. (24° C.).

Initial permeability of the core was measured using nitrogen at three different flow rates at 75° F. (24° C.). The results are shown in Table 2, below.

TABLE 2

| $q_{core}$, (cc/hr) | ΔP (psi) | $k_g$ (md) |
|---|---|---|
| 3739.1 | 4.7 | 247.2 |
| 5608.6 | 7.2 | 239.2 |
| 7478.1 | 9.9 | 232.3 |
| Permeability, $k_g$ (md) |  | 236.7 |

Brine (25,000 ppm sodium chloride) was introduced into the core 109 by the following procedure. The outlet end of the core holder was connected to a vacuum pump and a full vacuum was applied for 30 minutes with the inlet closed. The inlet was connected to a burette with the brine in it. The outlet was closed and the inlet was opened to allow 4.4 mL of brine to flow into the core, and the inlet value was closed to establish a brine saturation of 20%. The permeability was measured at the brine saturation of 20% by flowing nitrogen gas at 400 psig (2.76×10$^6$ Pa) and 75° F. (24° C.). The results are shown in Table 3, below.

TABLE 3

| $q_{core}$, (cc/hr) | ΔP (psi) | $k_g$ (md) |
|---|---|---|
| 7478.1 | 13.4 | 172.2 |
| 3739.1 | 6.1 | 188.8 |
| 5608.6 | 9.5 | 181.9 |
| Permeability, $k_g$ (md) |  | 181.0 |

Synthetic Hydrocarbon Mixture:

A synthetic hydrocarbon mixture containing 75 mole percent methane, 12 mole percent n-propane, 9 mole percent n-heptane, and 4 mole percent n-decane was used for the core flooding evaluation. Approximate values for various properties of the mixture are reported Table 4, below.

TABLE 4

|  | Pressure, psig (Pa) | | |
|---|---|---|---|
|  |  | 687 (4.7 × 10$^6$) | |
| Fluid Properties | 4460 (3.0 × 10$^7$) | Gas phase | Oil phase |
| Density, g/cc | 0.38 | 0.038 | 0.38 |
| viscosity, cp |  | 0.013 |  |
| Volume fraction |  | 0.94 |  |
| Interfacial tension, dynes/cm |  | 9.6 |  |

Core Flood Procedure:

Following the measurement of the nitrogen gas permeability at the brine saturation of 20%, the pressure of the core was raised to 200 psig (1.38×10$^6$ Pa), and the temperature of the oven 110 was raised to 154° F. (67.8° C.). The wrapped core 109 in the oven 110 was maintained at 154° F. (67.8° C.) for 12 hours.

An initial two-phase flood was conducted using the synthetic hydrocarbon mixture with the upstream back-pressure regulator 106 set at 4460 psig (3.1×10$^7$ Pa), above the dew point pressure of the fluid, and downstream back-pressure regulator 104 was set at about 687 psig (4.7×10$^6$ Pa). Two different flow rates (250 mL/hr and 150 mL/hr) were used. After a steady state was established, the relative permeability before treatment was then calculated from the steady state pressure drop. The results for the initial two-phase flood are shown in Table 5, below.

TABLE 5

| $q_{pump}$, cc/hr | 250 | 125 |
|---|---|---|
| $q_{total\_core}$, cc/hr | 1340.7 | 670.4 |
| $q_{g\_core}$, cc/hr | 1264.0 | 632.0 |
| $q_{o\_core}$, cc/hr | 76.7 | 38.3 |
| ΔP, psi | 30.6 | 16.5 |
| $k_{rg}$ | 0.038 | 0.035 |
| $k_{ro}$ | 0.041 | 0.038 |
| Nc | 2.51 * 10$^{-5}$ | 1.36 * 10$^{-5}$ |

Figure 3:
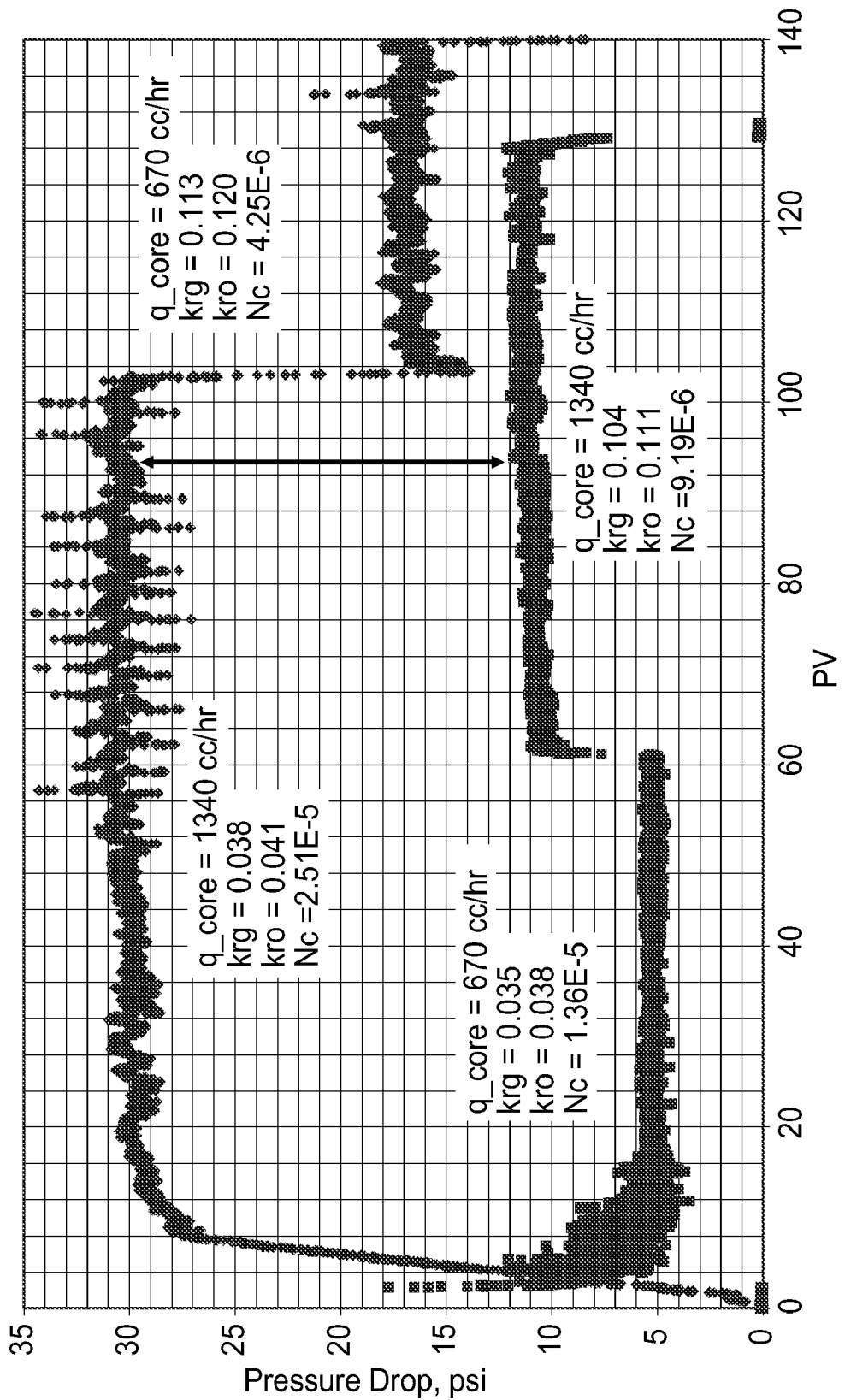
FIG. 3 is a graph depicting the pressure drop versus pore volume for the pre- and post-treatment two-phase flow experiment in the Example.

The treatment composition was then injected into the core for 19 pore volumes. The composition was held in the core at 154° F. (67.8° C.) for about 24 hours. A post-treatment two-phase flood was then conducted using the same conditions as the initial two-phase flood. After a steady state was established, the relative permeability after treatment was then calculated from the steady state pressure drop. The results are shown in Table 6, below, and in FIG. 3.

TABLE 6

| $q_{pump}$, cc/hr | 250 | 125 |
|---|---|---|
| $q_{total\_core}$, cc/hr | 1340.7 | 670.4 |
| $q_{g\_core}$, cc/hr | 1264.0 | 632.0 |
| $q_{o\_core}$, cc/hr | 76.7 | 38.3 |
| ΔP, psi | 11.2 | 5.2 |
| $k_{rg}$ | 0.10 | 0.11 |
| $k_{ro}$ | 0.11 | 0.12 |
| Nc | 9.2 * 10$^{-6}$ | 4.25 * 10$^{-6}$ |
| Improvement Factor | 2.7 | 3.0 |

Following the relative permeability measurements, methane gas was injected, using positive displacement pump 102, to displace the synthetic hydrocarbon mixture and measure the final single-phase gas permeability. The results are shown in Table 7, below.

TABLE 7

| $q_{core}$, (cc/hr) | ΔP (psi) | $k_g$ (md) |
|---|---|---|
| 3101.4 | 3.5 | 272.6 |
| 4652.1 | 5.4 | 265.1 |
| Permeability, $k_g$ (md) |  | 268.9 |

For Comparative Example A, the method of the Example was carried out except with the following modifications. The initial brine saturation was 19% by weight, and the composition of the brine is given in Table 8, below.

TABLE 8

| Component | Concentration, g/L |
| --- | --- |
| Calcium chloride hexahydrate | 7.7 |
| Magnesium chloride hexahydrate | 1.7 |
| Potassium chloride | 0.66 |
| Sodium chloride | 64.5 |

A synthetic hydrocarbon mixture that exhibits retrograde gas condensate behavior was used. The synthetic hydrocarbon mixture contained 89 mole percent methane, 5 mole percent n-butane, 2.5 mole percent n-heptane, 2.5 mole percent n-decane, and 1 mole percent n-pentadecane. The core flood was carried out at 175° F. (79.4° C.). For the pre-treatment relative permeability measurements, the fluid was flashed through the upstream back-pressure regulator at 5100 psig (35.2 MPa). The core pressure was set by the downstream back-pressure regulator at 420 psig (2.9 MPa). After the pre-treatment measurement, the core was treated with 18 pore volumes of treatment composition containing 2% nonionic polymer 1, 69% 2-butoxyethanol, and 29% ethanol, and the treatment was shut in the core for 15 hours. The steady state two-phase flow of gas and condensate was then done under the same conditions as the pre-treatment two-phase flow. Table 9, below, summarizes the results for the pre-treatment and post-treatment two-phase flows. Additional details of this example may be found in Example 2 of Int. Pat. App. Pub. No. WO/2008/118241 (Pope et al.), the disclosure of which example is incorporated herein by reference.

TABLE 9

| | krg | kro | Improvement factor |
| --- | --- | --- | --- |
| Pre-treatment flow | 0.065 | 0.025 | Not applicable |
| Post-treatment flow | 0.12 | 0.047 | 1.9 |

For Comparative Example B, the method of the Example was carried out except with the following modifications. The initial brine saturation was 26% by weight, and the composition of the brine was 92.25% water, 5.9% sodium chloride, 1.6% calcium chloride, 0.23% magnesium chloride hexahydrate, and 0.05% potassium chloride. A synthetic hydrocarbon mixture that exhibits retrograde gas condensate behavior was used. The synthetic hydrocarbon mixture contained 93 mole percent methane, 4 mole percent n-butane, 2 mole percent n-decane, and 1 mole percent n-pentadecane. The core flood was carried out at 275° F. (135° C.). For the pre-treatment relative permeability measurements, the fluid was flashed through the upstream back-pressure regulator at about 4900 psig (33.8 MPa). The core pressure was set by the downstream back-pressure regulator at 1500 psig (2.9 MPa). After the pre-treatment measurement, the core was treated with at least 20 pore volumes of treatment composition containing 2% nonionic polymer 1, 94% methanol, and 4% water, and the treatment was shut in the core for about 15 hours. The steady state two-phase flow of gas and condensate was then done under the same conditions as the pre-treatment two-phase flow. The initial single-phase gas permeability, measured prior to brine saturation at a flowing pressure of 1200 psig (8.3×10$^6$ Pa), the initial capillary number, the gas relative permeability before treatment with the composition, the gas relative permeability after treatment, and the ratio of the gas relative permeabilities after and before treatment (i.e., improvement factor) are shown in Table 10, below.

TABLE 10

| | COMPARATIVE EXAMPLE B |
| --- | --- |
| Gas permeability, millidarcy (md) | 231 |
| Capillary number | 1.1 × 10$^{-5}$ |
| Gas relative permeability before treatment | 0.084 |
| Gas relative permeability after treatment | 0.084 |
| Improvement factor | 1.0 |

Various modifications and alterations of this disclosure may be made by those skilled in the art without departing from the scope and spirit of this invention, and it should be understood that this invention is not to be unduly limited to the illustrative embodiments set forth herein.

The invention claimed is:

1. A method of treating a formation bearing oil and brine, the method comprising:

contacting the formation with a composition comprising solvent and a nonionic polymer, wherein the nonionic polymer comprises:

at least one divalent unit represented by formula:

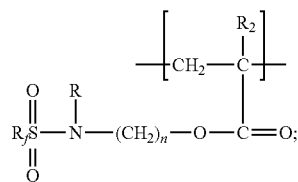

and a poly(alkyleneoxy) segment;

wherein $R_f$ represents a perfluoroalkyl group having from 1 to 8 carbon atoms;

R and $R_2$ are each independently hydrogen or alkyl of 1 to 4 carbon atoms; and n is an integer from 2 to 10;

wherein the solvent at least one of at least partially solubilizes or at least partially displaces at least one of the oil or the brine in the formation, wherein the oil is at least one of black oil or volatile oil, and wherein the formation has at least one of an oil permeability or a fracture conductivity that is increased after the composition contacts the formation.

2. The method according to claim 1, wherein the nonionic polymer comprises at least one divalent unit represented by a formula:

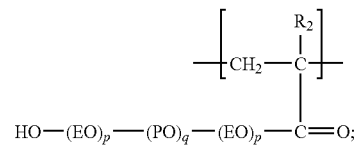

-continued

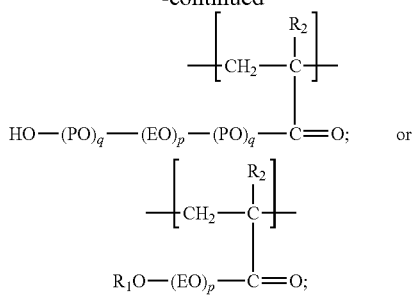

wherein
  $R_1$ and $R_2$ are each independently hydrogen or alkyl of 1 to 4 carbon atoms;
  EO represents —$CH_2CH_2O$—;
  each PO independently represents —$CH(CH_3)CH_2O$— or —$CH_2CH(CH_3)O$—;
  each p is independently an integer of 1 to about 128; and
  each q is independently an integer of 0 to about 55.

3. The method according to claim 1, wherein the oil is volatile oil.

4. The method according to claim 1, wherein the solvent comprises at least one of a polyol or polyol ether, and wherein the polyol and polyol ether independently have from 2 to 25 carbon atoms.

5. The method according to claim 4, wherein the polyol is at least one of ethylene glycol, propylene glycol, polypropylene glycol), 1,3-propanediol, or 1,8-octanediol, and wherein the polyol ether is at least one of 2-butoxyethanol, diethylene glycol monomethyl ether, ethylene glycol monobutyl ether, or dipropylene glycol monomethyl ether.

6. The method according to claim 1, wherein the solvent comprises at least one monohydroxy alcohol, ether, or ketone, each independently having up to 4 carbon atoms.

7. The method according to claim 1, wherein the formation has a temperature, and wherein when the composition is contacting the formation, the nonionic polymer has a cloud point that is above the temperature of the formation.

8. The method according to claim 1, the method further comprising contacting the formation with a fluid prior to contacting the formation with the composition, wherein the fluid at least one of at least partially solubilizes or at least partially displaces the brine in the formation, and wherein the fluid is essentially free of nonionic fluorinated polymers.

9. The method according to claim 1, the method further comprising contacting the formation with a fluid prior to contacting the formation with the composition, wherein the fluid comprises at least one of toluene, diesel, heptane, octane, methane, nitrogen, carbon dioxide, water, methanol, ethanol, or isopropanol.

10. The method according to claim 1, the method further comprising contacting the formation with a fluid prior to contacting the formation with the composition, wherein the fluid comprises at least one of a polyol or polyol ether, and wherein the polyol and polyol ether independently have from 2 to 25 carbon atoms.

11. The method according to claim 1, wherein the formation is penetrated by a well bore, and wherein a region near the well bore is contacted with the composition.

12. The method according to claim 11, further comprising obtaining hydrocarbons from the well bore after contacting the formation with the composition.

13. The method according to claim 1, wherein the formation has at least one fracture.

14. The method according to claim 13, wherein the fracture has a plurality of proppants therein, and wherein contacting the formation comprises contacting at least one of the fracture or at least a portion of the plurality of proppants.

15. The method according to claim 13, wherein the fracture has a volume, and wherein an amount of the composition is used to contact the formation based at least partially on the volume of the fracture.

16. The method according to claim 1, wherein $R_f$ is perfluorobutyl.

17. A formation bearing oil and brine, wherein the formation is penetrated by a well bore, wherein the oil is at least one of black oil or volatile oil, and wherein a region of the formation near the well bore is treated according to the method of claim 1.

18. The formation according to claim 17, wherein the formation is a clastic formation, and wherein the nonionic polymer is adsorbed on the clastic formation.

19. The formation according to claim 17, wherein the formation has at least one fracture, wherein the fracture has a plurality of proppants, and wherein the nonionic polymer is adsorbed on at least a portion of the plurality of proppants.

20. A method of making a composition, the method comprising:
  selecting a geological zone of a formation bearing at least one of black oil or volatile oil, the geological zone having a temperature, a hydrocarbon composition, and a brine composition;
  receiving data comprising the temperature, the hydrocarbon composition, and the brine composition of the geological zone of the formation;
  generating a formulation comprising a nonionic polymer and solvent, wherein the nonionic polymer comprises at least one divalent unit represented by formula:

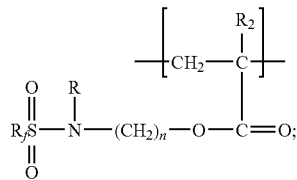

and
  a poly(alkyleneoxy) segment;
  wherein
    $R_f$ represents a perfluoroalkyl group having from 1 to 8 carbon atoms;
    R and $R_2$ are each independently hydrogen or alkyl of 1 to 4 carbon atoms; and
    n is an integer from 2 to 10;
  wherein the formulation is generated based at least in part on compatibility information concerning the nonionic polymer, the solvent, the temperature, and at least one of the hydrocarbon composition or the brine composition of the geological zone of the formation; and
  making the composition according to the formulation.

* * * * *